(12) United States Patent
Clavijo et al.

(10) Patent No.: US 10,910,150 B2
(45) Date of Patent: Feb. 2, 2021

(54) RECONFIGURABLE COUPLED INDUCTOR

(71) Applicant: Intel Corporation, Santa Clara, CA (US)

(72) Inventors: Sergio Augusto Clavijo, Phoenix, AZ (US); Donghwi Kim, Chandler, AZ (US); Tae Kim, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 14/954,657

(22) Filed: Nov. 30, 2015

(65) Prior Publication Data
US 2017/0154725 A1    Jun. 1, 2017

(51) Int. Cl.
*H01F 27/40* (2006.01)
*H01F 27/38* (2006.01)
*G06F 1/26* (2006.01)
*H01F 29/14* (2006.01)

(52) U.S. Cl.
CPC .............. *H01F 27/40* (2013.01); *G06F 1/26* (2013.01); *H01F 27/38* (2013.01); *H01F 2029/143* (2013.01)

(58) Field of Classification Search
CPC ........... H01F 27/42; H01F 27/38; H01F 27/40
See application file for complete search history.

(56) References Cited

U.S. PATENT DOCUMENTS

| | | | | |
|---|---|---|---|---|
| 1,896,767 A | * | 2/1933 | Buckley | H01F 27/42 178/46 |
| 2,769,138 A | * | 10/1956 | Obermaier | H01F 38/06 318/513 |
| 3,015,059 A | * | 12/1961 | Sangl | H02J 3/1835 323/206 |
| 3,373,347 A | * | 3/1968 | Maka | G05F 1/325 323/250 |
| 3,553,620 A | * | 1/1971 | Cielo | G05F 1/62 336/165 |
| 3,873,910 A | * | 3/1975 | Willis, Jr. | H05B 41/3924 315/194 |
| 4,162,428 A | * | 7/1979 | Elms | H05B 41/392 315/199 |
| 4,259,716 A | * | 3/1981 | Harris | H01F 19/04 336/155 |
| 4,766,365 A | * | 8/1988 | Bolduc | G05F 3/06 174/DIG. 17 |

(Continued)

FOREIGN PATENT DOCUMENTS

| | | | | |
|---|---|---|---|---|
| JP | 2000132247 | | 5/2000 | |
| JP | 2000132247 A | * | 5/2000 | ............... G05F 1/22 |

OTHER PUBLICATIONS

JP2000132247A, Machine Translation, May 2000.*

(Continued)

*Primary Examiner* — Elvin G Enad
*Assistant Examiner* — Malcolm Barnes
(74) *Attorney, Agent, or Firm* — Green, Howard & Mughal LLP

(57) ABSTRACT

A reconfigurable coupled inductor is disclosed. In one embodiment, the reconfigurable coupled inductor comprises metal rings and switches coupled to the metal rings to control at least one inductor property (e.g., coupling coefficient) based on a closed (e.g., on) or open state (e.g., off) of each switch.

16 Claims, 12 Drawing Sheets

(56) References Cited

U.S. PATENT DOCUMENTS

| | | | | |
|---|---|---|---|---|
| 4,841,428 | A * | 6/1989 | Washburn | G05F 3/06 |
| | | | | 323/331 |
| 4,994,952 | A * | 2/1991 | Silva | H01F 29/14 |
| | | | | 174/DIG. 17 |
| 5,872,489 | A * | 2/1999 | Chang | H01L 27/0611 |
| | | | | 257/531 |
| 6,232,841 | B1 * | 5/2001 | Bartlett | H03F 3/2176 |
| | | | | 330/302 |
| 6,317,021 | B1 * | 11/2001 | Jansen | H01F 27/24 |
| | | | | 336/155 |
| 9,514,875 | B2 * | 12/2016 | Worek | H01F 27/38 |
| 2001/0026463 | A1 * | 10/2001 | Hiltunen | H01F 30/10 |
| | | | | 363/98 |
| 2004/0036454 | A1 * | 2/2004 | Joerg | H01F 19/08 |
| | | | | 323/251 |
| 2004/0239466 | A1 * | 12/2004 | Rouser | H01F 27/26 |
| | | | | 336/200 |
| 2010/0295638 | A1 | 11/2010 | Hopper et al. | |
| 2010/0320994 | A1 * | 12/2010 | Hashino | H01F 27/385 |
| | | | | 323/312 |
| 2011/0248812 | A1 * | 10/2011 | Hu | H01F 29/14 |
| | | | | 336/221 |
| 2012/0286889 | A1 * | 11/2012 | Park | H03B 5/1212 |
| | | | | 331/117 FE |
| 2014/0253271 | A1 | 9/2014 | Heins | |
| 2015/0084718 | A1 * | 3/2015 | Maxim | H01F 17/0013 |
| | | | | 333/174 |
| 2016/0268994 | A1 * | 9/2016 | Granger-Jones | H01F 38/14 |
| 2016/0294284 | A1 * | 10/2016 | Lerdworatawee | H02M 3/155 |
| 2017/0179933 | A1 * | 6/2017 | Garrity | H03J 3/20 |

OTHER PUBLICATIONS

Schuellein, George., et al., "Mulitphase buck converter design responds well to transients" http://www.eetimes.com/document.asp?doc_id=1224753; Sep. 13, 2000.

PCT/US2016/045368, International Preliminary Report and Written Opinion, dated Jun. 14, 2018, (12 pages).

International Search Report and Written Opinion received for PCT Patent Application No. PCT/US2016/045368, dated Nov. 11, 2016, 13 pages.

* cited by examiner

| N | Freq (MHz) | L1 (nH) | Lm (nH) | k |
|---|---|---|---|---|
| 0 | 1 | 135.12 | 7.48 | 0.055 |
| 1 | 1 | 125.25 | 17.51 | 0.140 |
| 2 | 1 | 112.68 | 30.40 | 0.270 |
| 3 | 1 | 99.15 | 43.29 | 0.437 |
| 4 | 1 | 83.08 | 59.21 | 0.713 |
FIG. 5
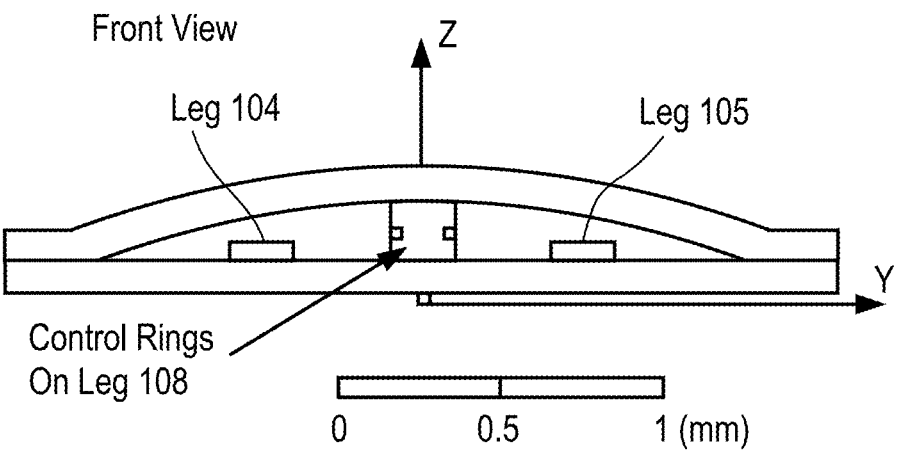
FIG. 6(A)
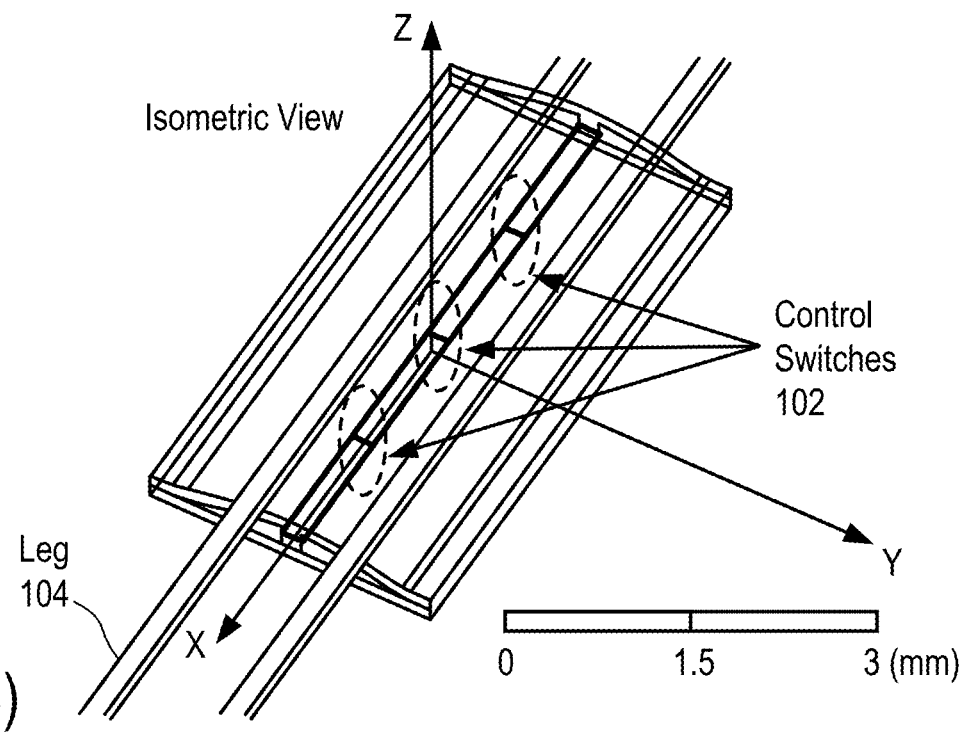
FIG. 6(B)

RECONFIGURABLE COUPLED INDUCTOR

FIELD OF THE INVENTION

Embodiments of the present invention relate to the field of inductors for use in devices such as computing systems; more particularly, embodiments of the present invention relate to coupled inductors that are reconfigurable to provide different inductances.

BACKGROUND OF THE INVENTION

One well-known type of inductor is referred to as a coupled inductor. While a normal inductor is coupled only to itself, a coupled inductor is a pair of inductors that are linked by electromagnetic induction such that when a current flows through one coil, the coil sets up a magnetic field which is coupled to a second coil and induces a voltage in that second coil.

Uncoupled inductors are used in some voltage regulator (VR) implementations in which a VR provides power to an integrated circuit (IC) such as, for example, a system-on-a-chip (SOC). In such cases, the inductors are coupled between the VR outputs and the power inputs (e.g., pins) of the IC. The properties of VR output inductors are not changed once populated.

Using a coupled inductor is known to have advantages over uncoupled inductors for efficiency and transient response in a relatively heavier loading condition (e.g., a processor in active mode). These advantages include lower core loss and heat dissipation due to lower peak-to-peak inductor current compared to their uncoupled inductor counterparts while achieving a fast transient response. However, certain VR states demand optimized uncoupled inductor properties in terms of efficiency. For example, a VR in a light-load condition (e.g., a processor in sleep or reduced power consumption mode) prefers to have an uncoupled inductor for its higher efficiency and lower leakage.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 is a chart illustrating the change in coupling coefficient based on the number of switches that are closed/open.

FIGS. 6A and 6B illustrate a front view and an isometric view of one embodiment of a reconfigurable coupled inductor.

DETAILED DESCRIPTION

Figure 1:
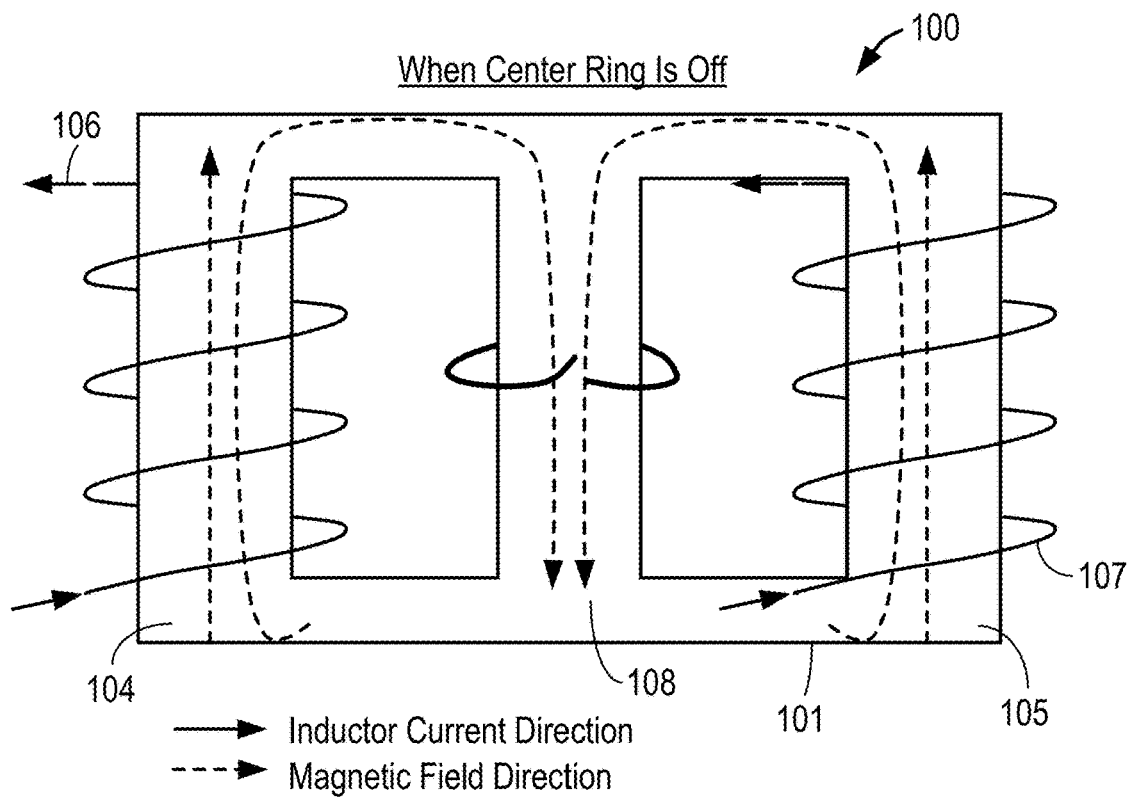
FIGS. 1-4 illustrate one embodiment of a reconfigurable coupled inductor.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A reconfigurable coupled inductor is disclosed. In one embodiment, the reconfigurable coupled inductor has a coupling coefficient that is configurable or changeable. The reconfigurable coupled inductor has a number of applications. For example, the reconfigurable coupled inductor is advantageously used with or within voltage regulator (VR) implementations. These VR implementations include fully integrated VR (FIVR) and platform VR. For example, the reconfigurable coupled inductor achieves both high efficiency in a wide range of loading conditions and better transient response in a multi-phase VR. The reconfigurable coupled inductor can be used for any application that uses a dynamic change of coupling coefficient.

In one embodiment, the reconfigurable coupled inductor described herein can be reconfigured from almost zero coupling coefficient (uncoupled) to high coefficient (highly-coupled) (e.g., a coupling coefficient of 1) in a real-time manner so that higher efficiency and fast transient response can be fulfilled from light load to heavy load by changing coupling coefficient accordingly.

By having an inductor that can reconfigure its coupling properties in real-time, the performance can be maximized while possibly minimizing cost by having to design only one inductor package (even for multi-phase VRs).

In one embodiment, to reconfigure an inductor's coupling coefficient in real-time, the inductor includes metal rings appropriately placed and controlled by switches. FIGS. 1-4 illustrate one embodiment of a reconfigurable coupled inductor. Referring to FIGS. 1-4, reconfigurable coupled inductor 100 comprises a core 101 and one or more switches 102 (shown in FIG. 3) coupled to core 101 to control a coupling property of inductor 101. In one embodiment, the coupling property of inductor 100 being controlled is the coupling coefficient. In another embodiment, other properties of inductor 100 are controlled including, for example, self-inductance.

Core 101 includes one or more metal rings 103 (shown in FIG. 2) controlled by switches 102, which induce electric currents on rings 103 when one or more of switches 102 is closed. Note that in one embodiment, rings 103 is a single ring. The number of rings that are included depends on the granularity of control that is desired.

Core 101 comprises a core material with first winding 106 and second winding 107 coupled thereto. In one embodiment, the core material comprises a magneto-dielectric material (e.g., ferrite, ferromagnetic material, etc.).

In one embodiment, the core material includes outer legs 104 and 105 around which winding 106 (e.g., a primary winding) and winding 107 (e.g., a secondary winding), respectively, are wound. Outer leg 104 and winding 106 form a first inductor and outer leg 105 and winding 107 form a second inductor.

The core material also includes at least one inner core portion coupled to outer legs 104 and 105 and having a third leg 108 extending across the core material and located between outer legs 104 and 105. In one embodiment, leg 108 is centrally located between outer legs 104 and 105. In another embodiment, leg 108 is closer to one of outer legs 104 and 105 than the other. In one embodiment, inner leg 108 is part of an H-shaped inner core portion coupled to outer legs 104 and 105. Note that the distance between inner leg 108 and the outer legs 104 and 105 is a design choice and no minimum distance is required. Also, note that the H-shape structure is not required and the teachings herein can be used in any other type of coupled inductor, such as, for example, a C-type structure.

Switches 102 are coupled to the inner core, inner leg 108, to control an amount of coupling between the inductors formed by outer legs 104 and 105 and their windings 106 and 107, respectively. Switches 102 control a coupling coefficient of the coupling based on the number of switches of switches 102 being closed or open. That is, the coupling coefficient of the coupling between the inductors formed by outer legs 104 and 105 and their windings 106 and 107 is set based on a number of the switches that are closed or open. In one embodiment, this coupling is fully coupled when all switches of switches 102 are closed and decoupled when none of switches 102 are closed (i.e., all of switches 102 are open). In one embodiment, each of switches 102 comprises an electric current switch that changes state from one, high resistivity to another, lower resistivity. In another embodiment, each of switches 102 comprises a transistor. In yet another embodiment, each of switches 102 comprises a Micro-Electro-Mechanical Systems (MEMs) structure. For high speed applications, switches 102 are high speed switches.

Figure 2:
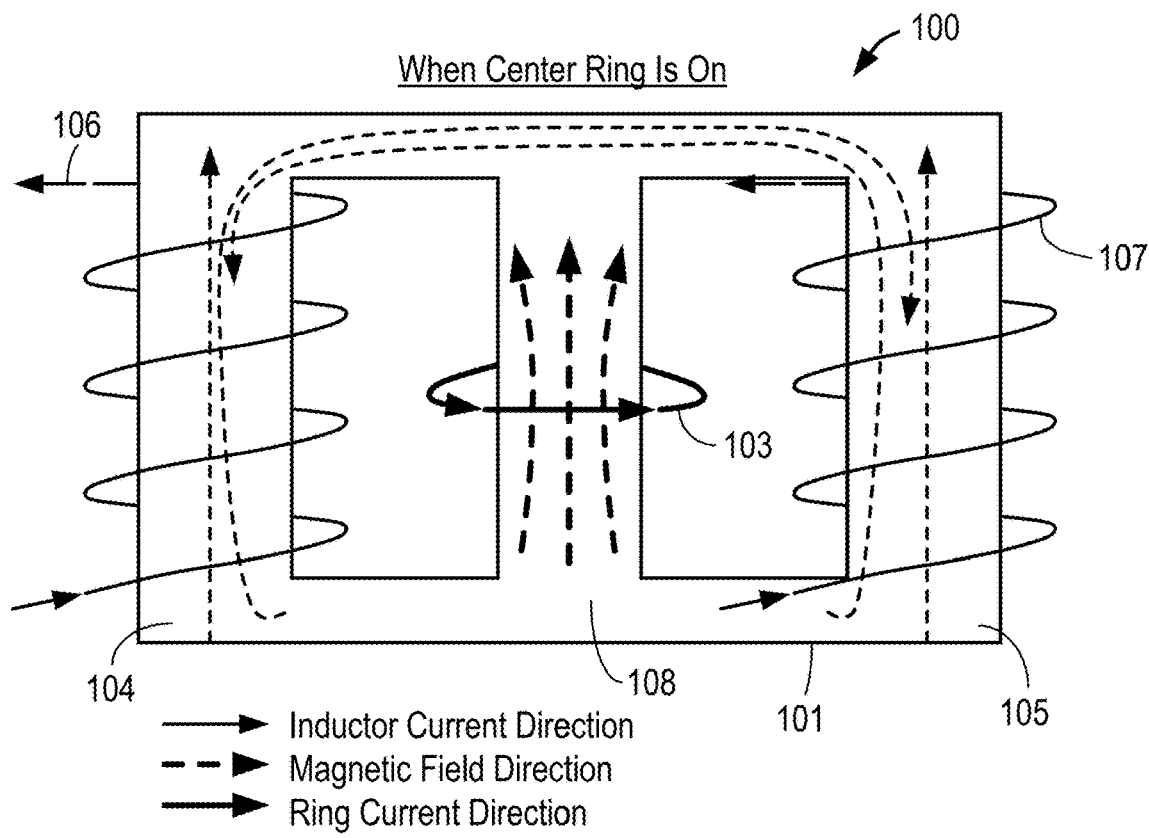

FIGS. 1 and 2 illustrate the inductor current direction and the magnetic field direction when the center ring is off and on respectively. Referring to FIG. 1, when the center ring is off, the magnetic field proceeds through inner leg 108. Referring to FIG. 2, when the center ring is on, a ring current is created in inner leg 108, which prevents the magnetic field from proceeding through inner leg 108.

More specifically, the coupled reconfigurable output inductor is able to control the coupling properties between the inductors formed by outer legs 104 and 105 and their windings 106 and 107 by manipulating the magnetic flux in inductor 100 with appropriately placed metal rings controlled by switches 102. The metal rings act as strong diamagnetic regions of space (effective permeability $\mu_r \sim 0$) when switches 102 are in the ON state by inducing electric currents on the rings which in turn generate an opposing magnetic field. When switches 102 are in the OFF state, the induced electric currents cannot flow around the rings and, therefore, the region of space where they are placed (e.g., inner leg 108) is minimally affected by the rings. This is shown in FIG. 1. However, as shown in FIG. 2, when switches 102 are in the ON state, the magnetic flux field is forbidden to exist in that region of space and when they are in the OFF state the magnetic field is unaffected by the rings.

Figure 3:
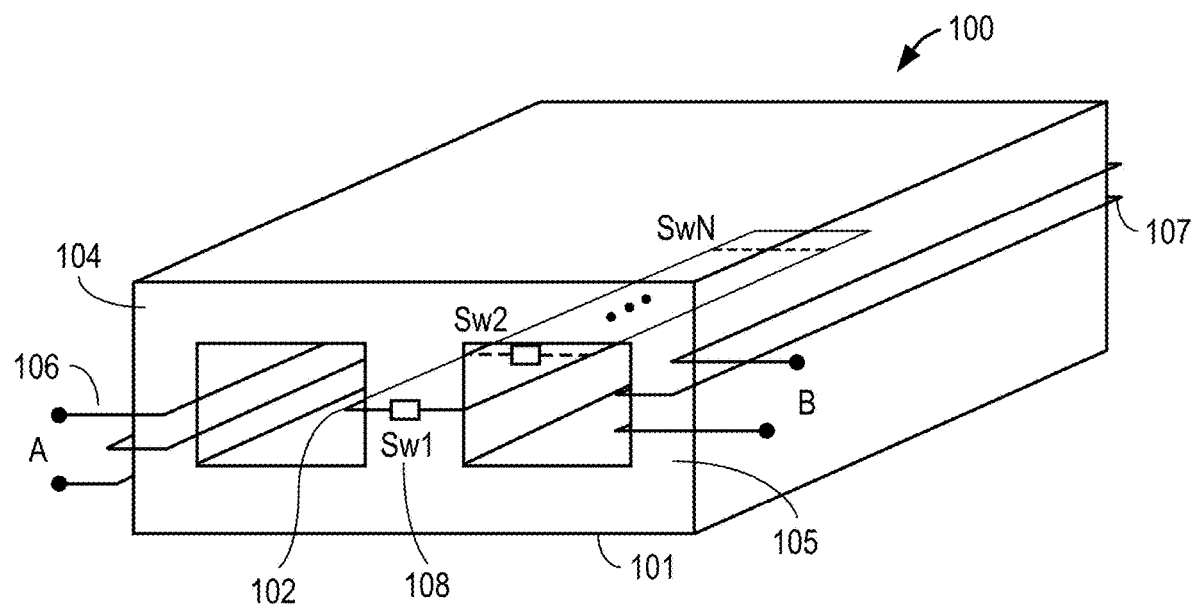
Figure 4:
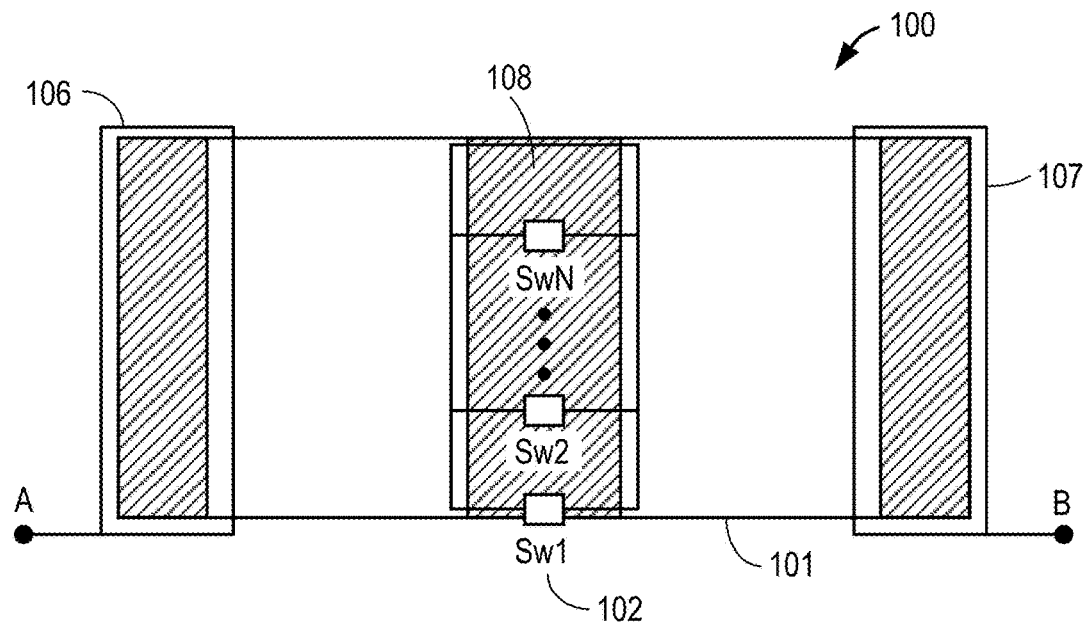

FIG. 3 illustrates an isometric view of one embodiment of the reconfigurable coupled inductor of FIGS. 1 and 2. FIG. 4 illustrates a top view of one embodiment of the reconfigurable coupled inductor of FIGS. 1 and 2. While FIG. 4 shows the switches through the center leg, this is not a requirement. In alternative embodiments, the switches are not evenly distributed and may be located only near one or the other ends of the center leg. In yet another embodiment, switches may be located near the ends of the center but not in the center portion of the center leg.

This control of the magnetic flux allows changing the coupling coefficient of an inductor by software or control logic. The range of control is, in principle, arbitrary from zero coupling to a given maximum coupling (e.g., 1). For example, in FIGS. 1-4, if Sw1, Sw2, through SwN are open, then we have the lowest magnetic coupling between inductors' terminals A and B. If Sw1, Sw2 through SwN are closed, there is maximum coupling between terminals A and B. Next, if Sw1 and Sw2 are open and Sw(N−1) and SwN are closed, there is an intermediate amount of magnetic coupling.

In one embodiment, the coupling coefficient of a coupled inductor changes from 0.06 (representing an uncoupled state) to 0.71 (representing a fully coupled state). FIG. 5 is a chart illustrating the change in coupling coefficient based on the number of switches that are closed/open from zero to four.

While the example of FIG. 5 shows four switches, the number of switches that are included in the reconfigurable coupled inductor is not limited to that number. In one embodiment, the number of switches included in the coupled inductor depends on the number needed to control the size of the desired magnetic field in order to control the coupling. In different embodiments, the number may vary from one switch to five switches, but is not limited to this amount. That is, the coupled inductor may have more than five switches (e.g., 6, 7, 8, 9, etc.). The number of switches also impacts the number of steps between the different coupling coefficients that may be produced for a reconfigurable coupled inductor. Thus, by adding more switches, the step size between different coupling coefficients can be changed, and thus controlled.

Also, while the switches are shown coupled to an inner leg positioned between and oriented substantially similarly with the outer legs of the inductor of FIGS. 1-4 (i.e., the two inductors), this is not required. In another embodiment, the switches are on another portion of the core material (e.g., a horizontal portion) between the two inductors of the reconfigurable coupled inductor.

With respect to the size of switches that may be used, if a FET switch is used, then the Rdson and breakdown voltage are considered and in one embodiment are related to the size of the FET.

FIGS. 6A and 6B illustrate a front view and an isometric view of another embodiment of a reconfigurable coupled inductor.

Figure 7:
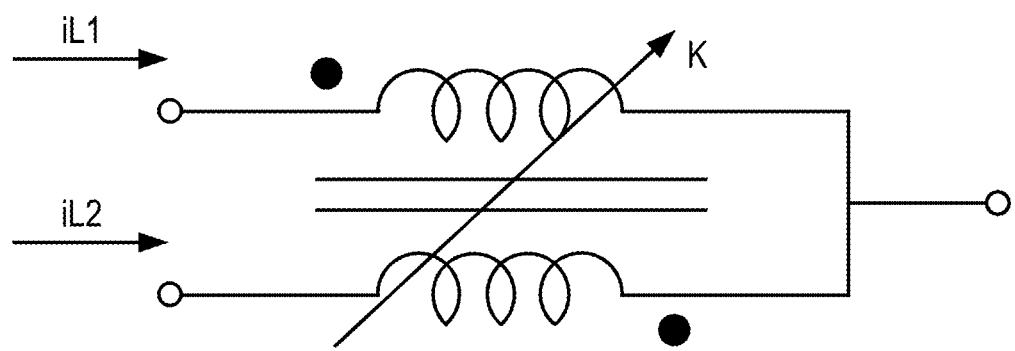
FIG. 7 is an electrical model of a reconfigurable coupling coefficient inductor.

FIG. 7 is an electrical model of a reconfigurable coupling coefficient (k≠0) inductor. This may be used to run a SPICE simulation. The mutual inductance (Lm) would be changed together upon a knob of k value. Lm is expressed as Lm=k*L11.

Figure 8:
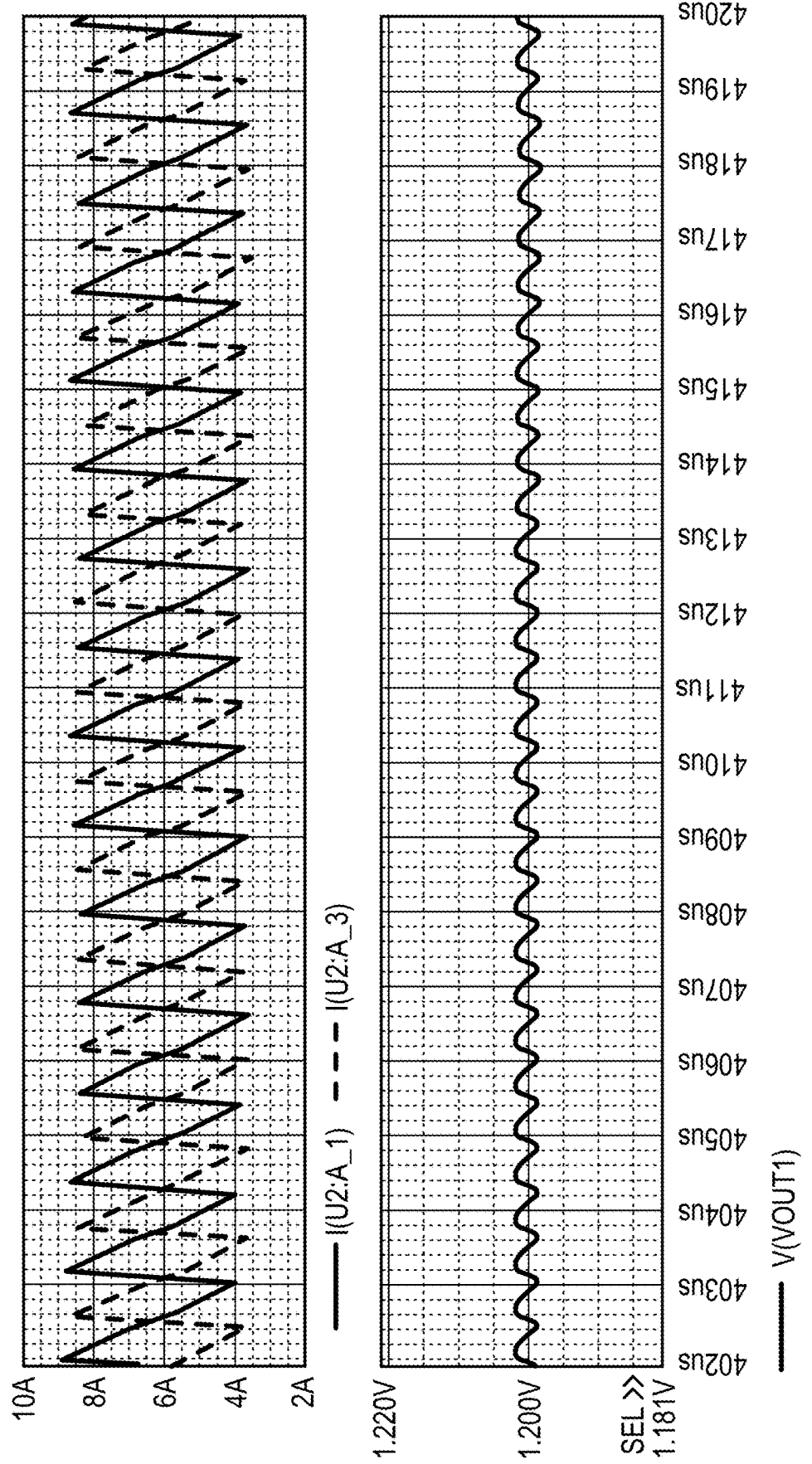
FIGS. 8 and 9 show simulation waveforms that were run with the model of coupling inductor of FIG. 7.
Figure 9:
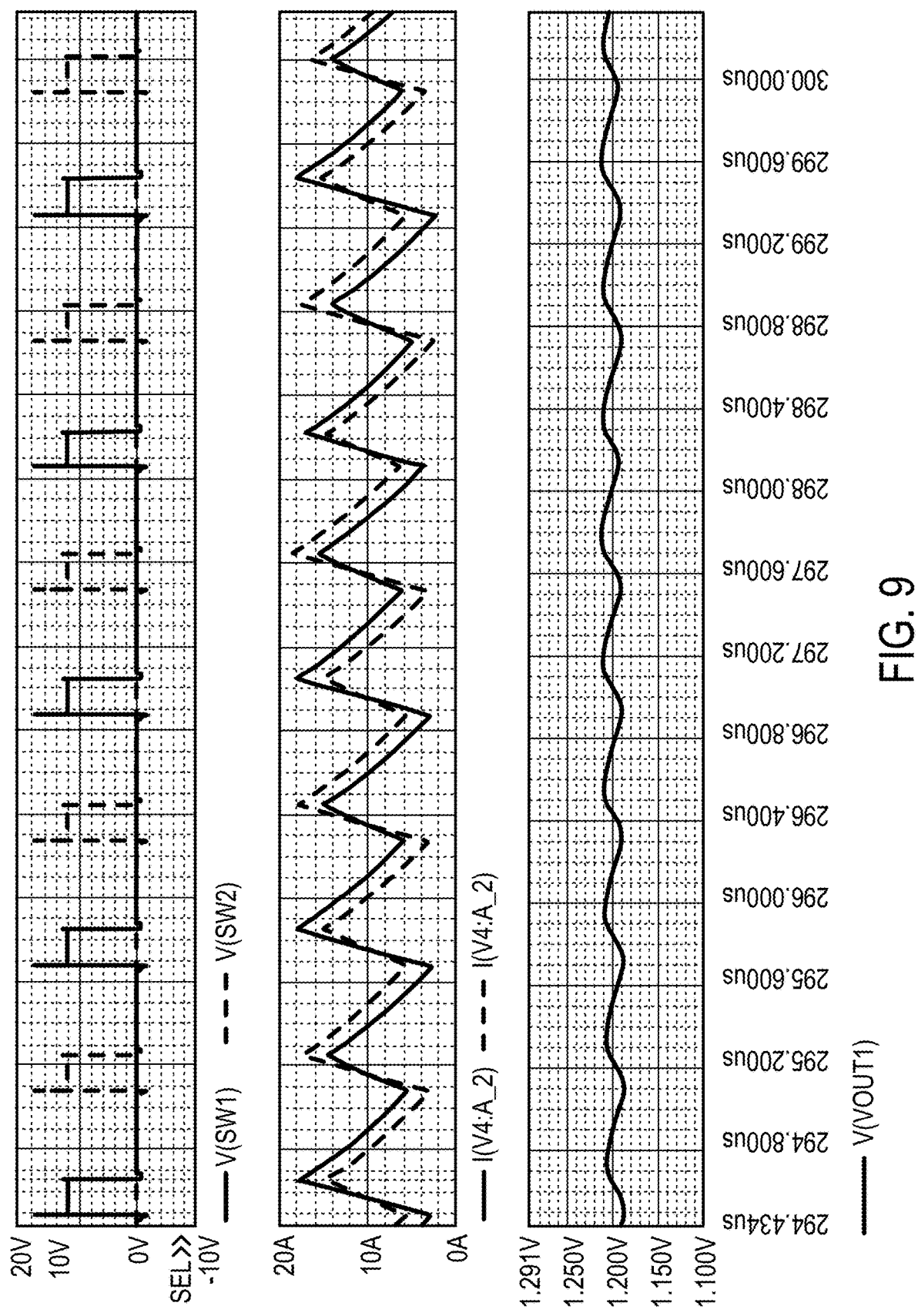

FIGS. 8 and 9 show simulation waveforms that were run with the model of the coupling inductor of FIG. 7. In one embodiment, the model is utilized as power stage inductor under the configuration of two stage interleaved step-down voltage regulator (VR) in PSPICE. In this simulation, it was assumed that there were two modes (N):

1. Uncoupled (switch OFF): k=0.05, L11=335 nH, Lm=17 nH.
2. Highly coupled (switch ON): k=0.71, L11=205 nH, Lm=146 nH.

Note that a higher k inductor can be utilized at relatively heavier loading (e.g., active mode of a processor, central processing unit (CPU), SoC, or other IC), while an uncoupled configuration is effectively run at light load condition (e.g., sleep or reduced power consumption mode of a processor/CPU/SoC/IC), enhancing efficiency compared to coupled inductor.

Referring to FIG. 8, using an uncoupled inductor model, a simulation waveform is shown in a two-phase interleaved step-down VR: k=0.05. The first row shows an inductor current for each phase, and the second row is the VR output (1.2V).

Referring to FIG. 9, using a highly coupled inductor model, a simulation waveform is shown in a two-phase interleaved step-down VR: k=0.71. The first row shows a power stage switch node for each phase, the second row is an inductor current each phase, and the third shows a VR output (1.2V).

The reconfigurable coupled inductor is not limited to an inductor having a core with inner legs. In an alternative embodiment, the inductor comprises an air core and the metal rings and switches are coupled to one of the loops of the inductor coil.

Furthermore, while an embodiment of the reconfigurable coupled inductor in FIGS. 1-4 operates as fully coupled when all switches are closed and decoupled when none of the switches are closed, the opposite operation is possible. That is, the reconfigurable coupled inductor can operate as fully coupled when all the switches are open and decoupled when none of the switches are open.

The reconfigurable coupled inductor is not limited to the embodiments shown in FIGS. 1-4 and 5-6 nor limited to use in 2-phase embodiments. For example, for a 4-phase design, two of the coupled inductors shown above in FIGS. 1-4 are used. Alternatively, a 4-phase design based on a single piece of core material may be designed.

Figure 10:
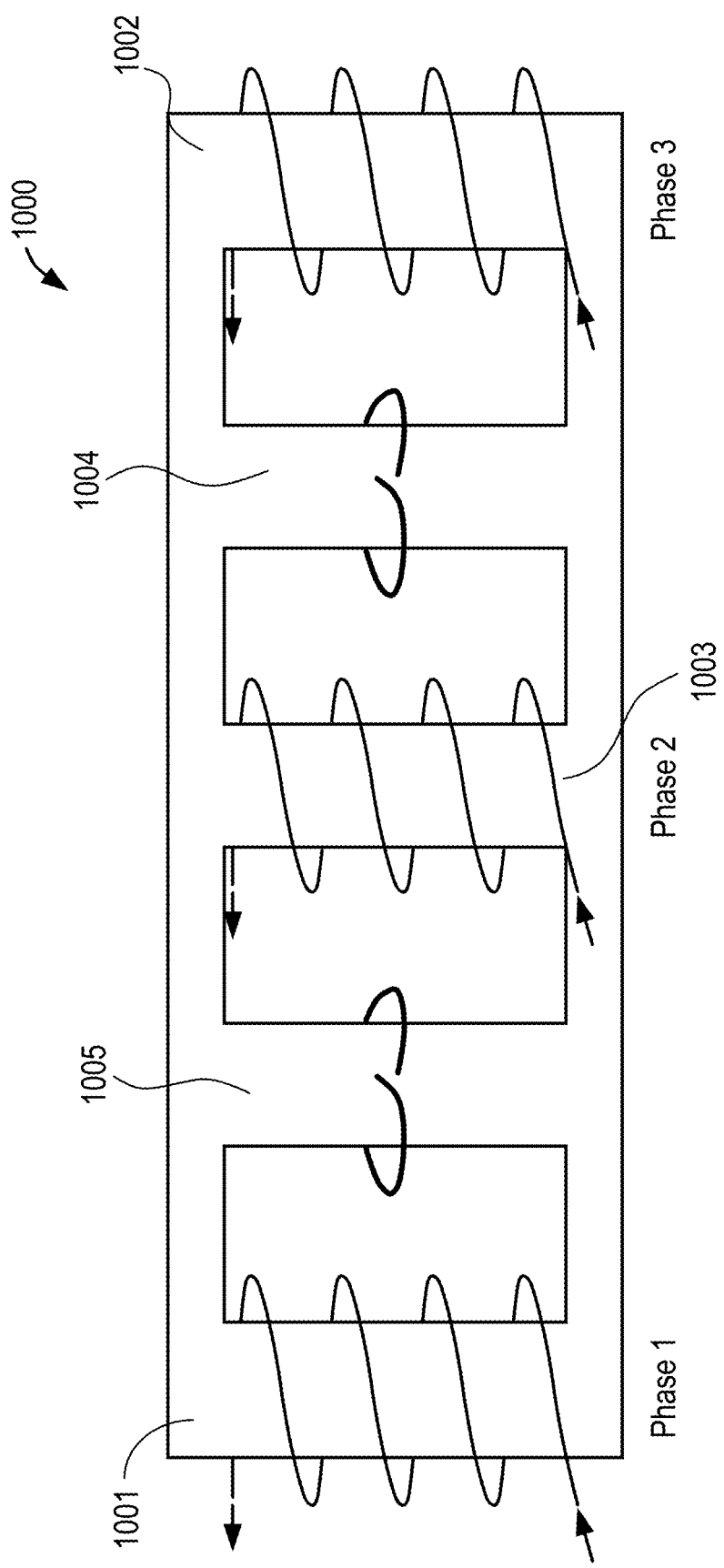
FIG. 10 illustrates one embodiment of a 3-phase coupled inductor.

FIG. 10 illustrates one embodiment of a 3-phase coupled inductor. Referring to FIG. 10, a core 1000 includes multiple legs. These legs include two outer legs 1001 and 1002 with windings, at least one inner leg 1003 with a winding thereon, and at least one leg, namely legs 1004 and 1005, extending across core 1000 and located between pairs of legs having windings. Each of legs 1001-1003 with their windings forms an inductor. Legs 1004 and 1005 have switches coupled thereto to control coupling between the inductors on either side of their respective legs.

Example Applications of a Reconfigurable Coupled Inductor

In one embodiment, the reconfigurable coupled inductor is used in a power delivery system. Such a system may include a power generator (e.g., a VR, a power converter, such as, for example, an inverter, a boost converter, a buck converter, a fly back converter, etc.) to generate power, one or more power stages coupled to receive power from the power generator and output it for use by another device (e.g., a processor, a CPU, SoC, IC, etc.), and a reconfigurable coupled inductor coupled to at least one of the power stages. Note that the teachings disclosed herein may be incorporated into any power converting device that uses inductors (DC/DC, AC/DC or AC/AC).

In one embodiment, the reconfigurable couple indicator is coupled to a pair of power stages that each provide one phase of power. In one embodiment, the coupled inductor is one of many that are part of a reconfigurable coupled inductor train coupled to multiple power stages, where an inductor train comprises one or several numbers of n-phase coupled inductors in one package.

In one embodiment, the switches of the coupled inductor are controlled by switch controller signals. In one embodiment, the switch controller signals are from the power converter or generator (e.g., a VR). In another embodiment, another controller is included in the power delivery system to generate the switch controller signals.

In one embodiment, the switches are implemented by either logic in a platform VR controlled by Serial Voltage Identification SVID) or FIVR logic in central processing unit (CPU) silicon.

In one embodiment, the switch controller signals allow the coupling coefficient of the reconfigurable coupled inductor in a VR to be intelligently changed depending upon the features or modes (e.g., phase shedding, sensed loading current, diode emulation modes, etc. but not limited to only these). More specifically, while in general, the coupled inductor coefficient can be changed by any application purpose, there are other examples of changing the coupling coefficient of the reconfigurable coupled inductor based on features and modes, such as:

1. In cases where the VR acts as a master, if the VR controller senses that the current is low (such as in cases of a light load) and gets a single-phase state, in one embodiment, the VR controller generates a mode change signal to the reconfigurable coupled inductor to become uncoupled. At the same time, the VR changes to the single phase;
2. In cases where the VR acts as a slave, in one embodiment, the processor sends a power state signal or a mode change signal to the VR and the VR generates a switch signal to the reconfigurable coupled inductor to become coupled or uncoupled;
3. Coupling coefficient may have a lot more granularity based on the manner in which the control is implemented. For example, the coupling coefficient can be 0.9, 0.7, 0.5, 0.3, etc.; and
4. In the case of diode emulation during light load, it's permissible to leave the reconfigurable coupled inductor in the uncoupled state, which can be changed based on application needs.

With each mode controlled via SVID from CPU (platform) or from CPU core logic (for FIVR), a reconfigurable coupling coefficient coupled inductor in a VR provides high efficiency in a wide range of loading and/or better transient response.

For VR applications, depending on the rail and its requirements (whether efficiency is paramount or transient response is paramount), in one embodiment, the inductance is individually tailored for best performance.

In another use case, a multi-phase VR having only one part as the multi-phase coupled inductor that provides the needed inductance for each phase. In such a case, the inductor gives all the flexibility that the VR needs. In fact, this can be done in real-time depending on the instantaneous demand of the system.

Figure 11:
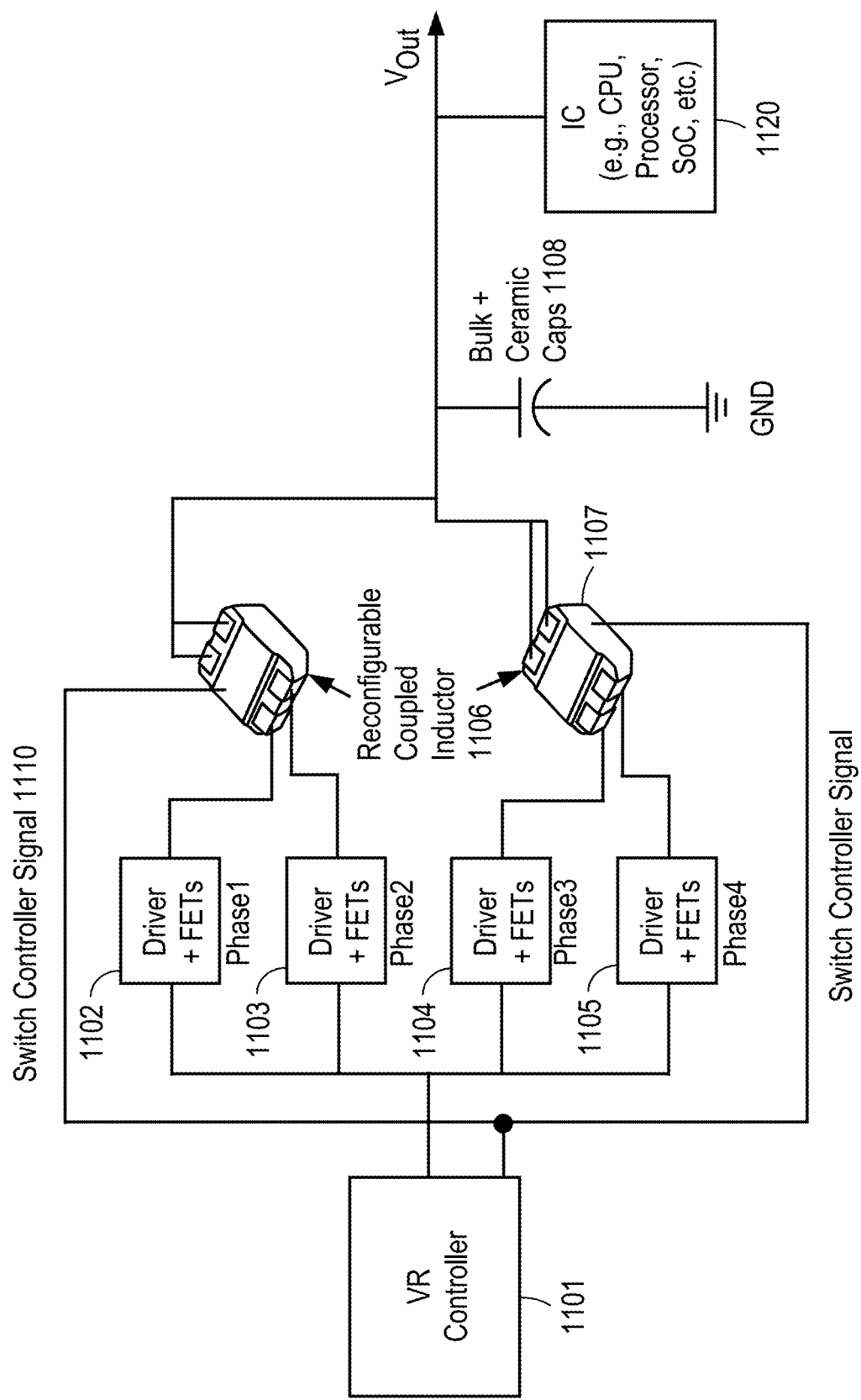
FIG. 11 is a block diagram of one embodiment of a VR-based power delivery system.

FIG. 11 is a block diagram of one embodiment of a VR-based power delivery system. Referring to FIG. 11, VR controller 1101 generates power and provides the power to power stages 1102-1105, which represent phases 1-4, respectively. Each of power stages 1102-1105 includes a driver and power gate switches (e.g., field effect transistors (FETs)). Each of the power stages output power to a reconfigurable coupled inductor. For example, power stages 1102 and 1103 output power to reconfigurable coupled inductor 1106, while power stages 1104 and 1105 output power to reconfigurable coupled inductor 1107. Both of reconfigurable coupled inductors 1106 and 1107 are coupled to bulk and ceramic capacitors 1108, which outputs a voltage Vout. The output voltage Vout is provided to power one or more ICs and devices, such as IC 1120 (e.g., CPU, processor, SoC, etc.). Thus, in the case of the VR-based power delivery system of FIG. 11, one reconfigurable coupled inductor is used for two phases.

VR controller 1101 generates switch control signals 1110 to control the switches of the reconfigurable coupled inductors 1106 and 1107. In one embodiment, switch control signals 1110 are sent in response to control signals sent by IC 1120 on a SVID bus (not shown) to VR controller 1101. Other buses may be used, such as, for example, System Management Bus (SMBUS), Power Management Bus (PMBUS), I2C, etc. Note that while FIG. 11 only shows two reconfigurable coupled inductors, other power delivery systems may use more depending on the number of phases provided by the VR controller (or other power source). For example, a 10-phase controller has five coupled inductors. Furthermore, other power delivery systems that only provide two phases only need one reconfigurable coupled inductor.

Given that coupled inductors have shown to have advantages in terms of efficiency and transient response, they are a natural candidate for VR-based power delivery system in that they provide the flexibility to allow coupled inductors to improve, and potentially even maximize, the VR's performance in real-time. For example, at light load (e.g., a processor/CPU/SoC/IC operating in sleep or reduced power consumption mode (e.g., PS1, PS2, PS3, etc.)), coupled inductors reduce the achievable efficiency by burning power in the freewheeling diode of unused phases. By on-demand control of the coupling coefficient at the moment of power state changes, the VR can be controlled to run as a single-phase VR with very low coupling coefficient (completely un-coupled if needed).

Figure 12:
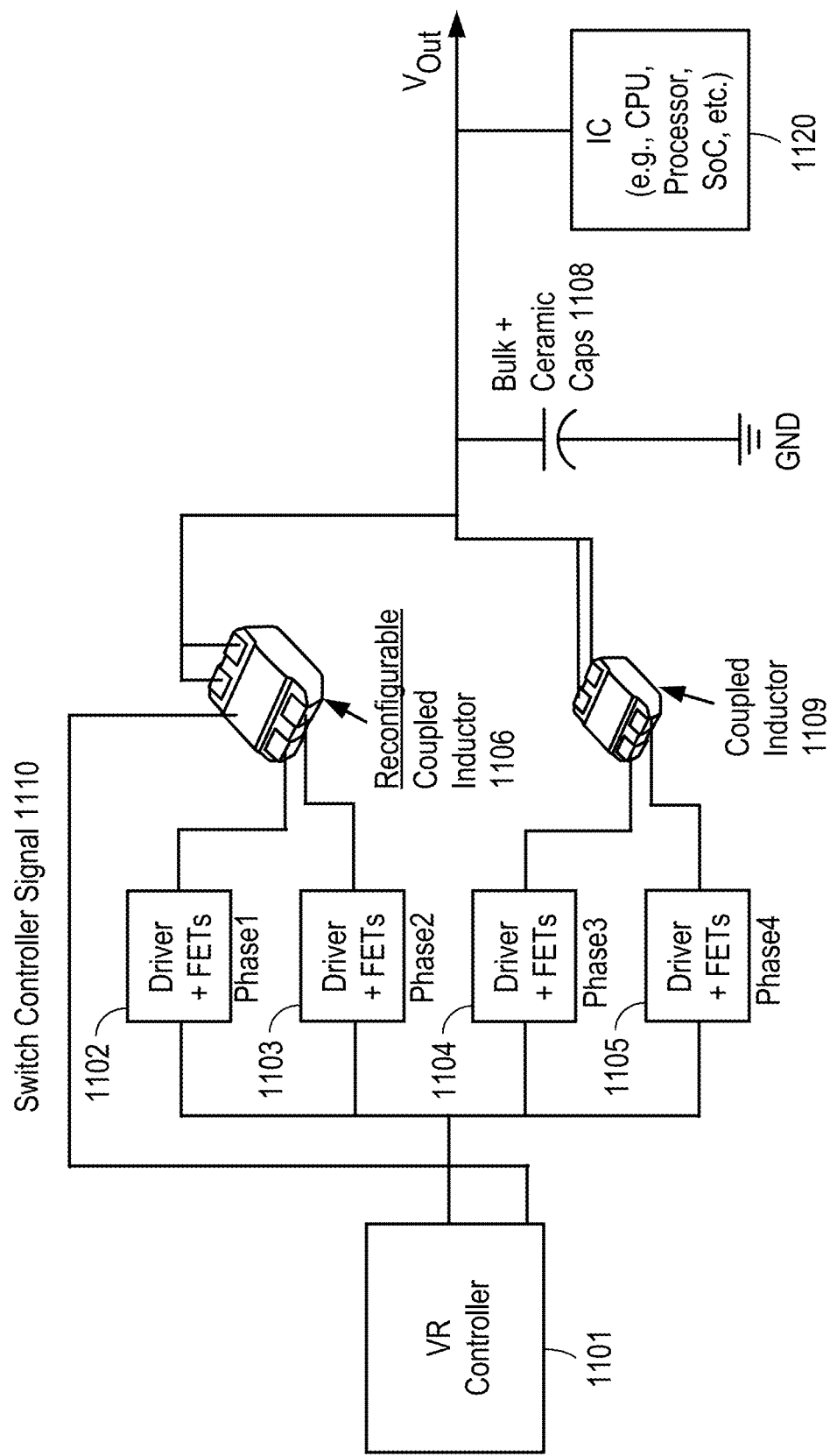
FIG. 12 is a block diagram of another embodiment of a VR-based power delivery system.

FIG. 12 is a block diagram of another embodiment of a VR-based power delivery system. Referring to FIG. 12, VR controller 1101 generates power and provides the power to power stages 1102-1105, which represent phases 1-4, respectively. Each of power stages 1102-1105 includes a driver and power gate switches (e.g., field effect transistors (FETs). Each of the power stages output power to a coupled inductor. For example, power stages 1102 and 1103 output power to reconfigurable coupled inductor 1106. On the other hand, power stages 1104 and 1105 output power to coupled inductor 1109. Each of coupled inductors 1106 and 1107 are coupled to bulk and ceramic capacitors 1108, which outputs a voltage Vout. The output voltage Vout is provided to power one or more ICs and devices, such as IC 1120 (e.g., CPU, processor, SoC, etc.). Thus, in the case of the VR-based power delivery system of FIG. 12, only one reconfigurable coupled inductor is used for phases 1 and 2, while the other phases use a typical, non-reconfigurable coupled inductor. This improves light load efficiency and saves extra cost for the rest of phases.

VR controller 1101 generates switch control signals 1110 to control the switches of the reconfigurable coupled inductor 1106. In one embodiment, switch control signals 1110 are sent in response to control signals sent by IC 1120 on a SVID bus (not shown) to VR controller. Other buses may be used. Depending on the current situation in the system, in one embodiment, switch control signals 1110 may cause coupled inductors 1006 and 1007 to be fully uncoupled at the same time, fully coupled at the same time (such as for a heavy load, e.g., PS0 or active mode for IC 1120), or have a different coupling from each other at the same time, which controls the amount of power provided to IC 1120.

Note that while FIG. 12 only shows one reconfigurable coupled inductor, other power delivery systems may use more depending on the number of phases provided by the VR controller (or other power source). For example, a 10-phase controller has two reconfigurable coupled inductors and three non-reconfigurable coupled inductors, has three reconfigurable coupled inductors and two non-reconfigurable coupled inductors, or four reconfigurable coupled inductors and one non-reconfigurable coupled inductor.

Figure 13:
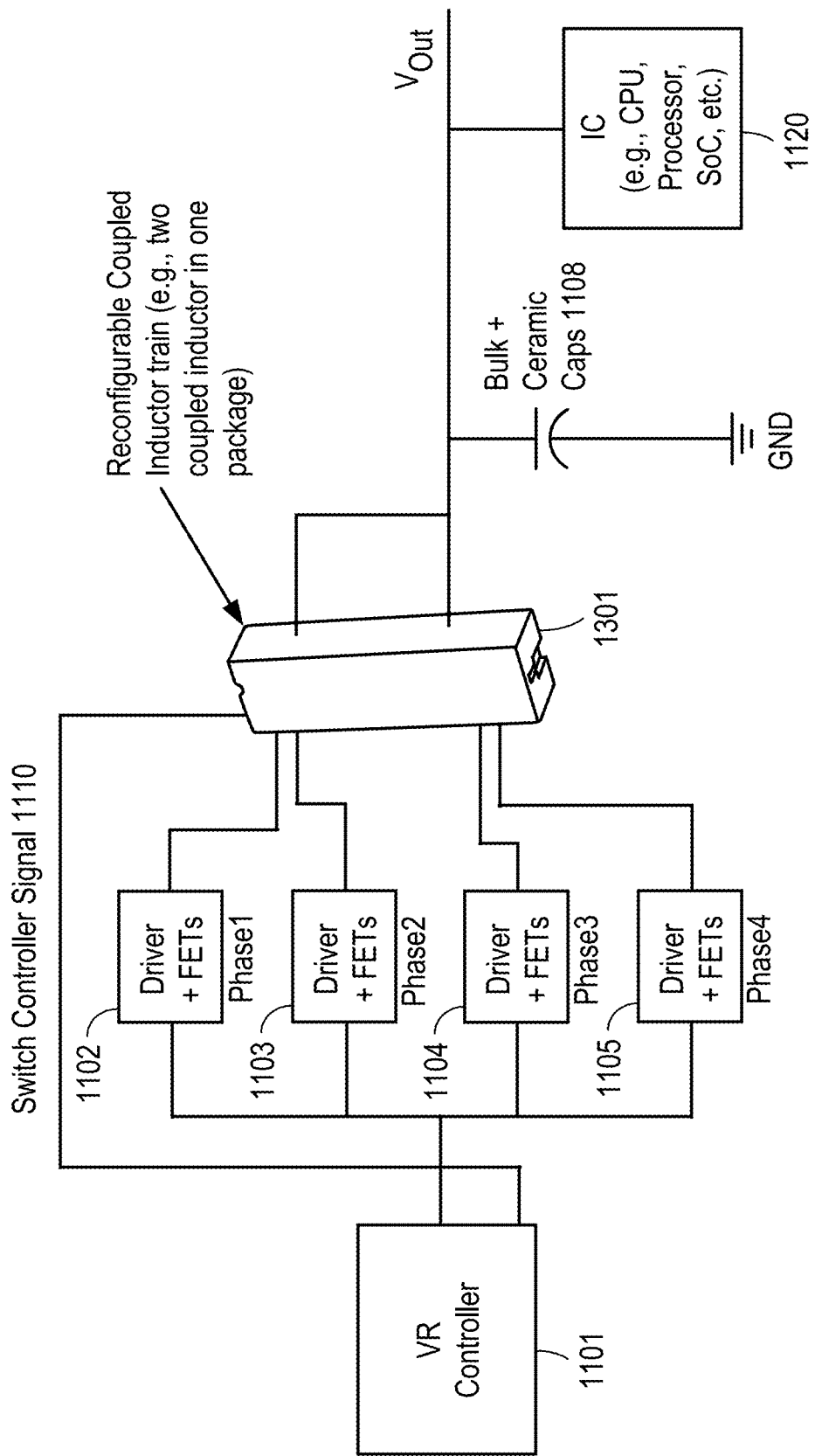
FIG. 13 is a block diagram of yet another embodiment of a VR-based power delivery system.

FIG. 13 is a block diagram of yet another embodiment of a VR-based power delivery system. Referring to FIG. 13, VR controller 1101 generates power and provides the power to power stages 1102-1105, which represent phases 1-4, respectively. Each of power stages 1102-1105 includes a driver and power gate switches (e.g., field effect transistors (FETs)).

Each of the power stages 1102-1105 output power to a reconfigurable coupled inductor train 1301 that contains multiple (e.g., 2 in this case) reconfigurable coupled inductors. Reconfigurable coupled inductor train 1301 is coupled to bulk and ceramic capacitors 1108, which outputs a voltage Vout. The output voltage Vout is provided to power one or more ICs and devices, such as IC 1120 (e.g., CPU, processor, SoC, etc.).

VR controller 1101 generates switch control signals 1110 to control the switches of the reconfigurable coupled inductors of reconfigurable coupled inductor train 1301. In one embodiment, switch control signals 1110 are sent on an SVID bus. Other buses may be used. Depending on the current situation in the system, in one embodiment, switch control signals 1110 may cause coupled inductors 1006 to be fully uncoupled, fully coupled (such as for a heavy load, e.g., PS0 or active mode for IC 1120), or have a different coupling from coupled inductor 1007, which controls the amount of power provided to IC 1120.

Note that in one embodiment some or all of the VR controller, power stages, reconfigurable coupled inductors and non-reconfigurable coupled inductors in FIGS. 11-13 may be contained in a single integrated circuit (e.g., a VR) or may be separate components on a substrate (e.g., printed circuit board).

A reconfigurable coupled inductor VR provides higher efficiency and fast transient for a wide range of load so that it can save cost for passives and real estate as an extra benefit.

Figure 14:
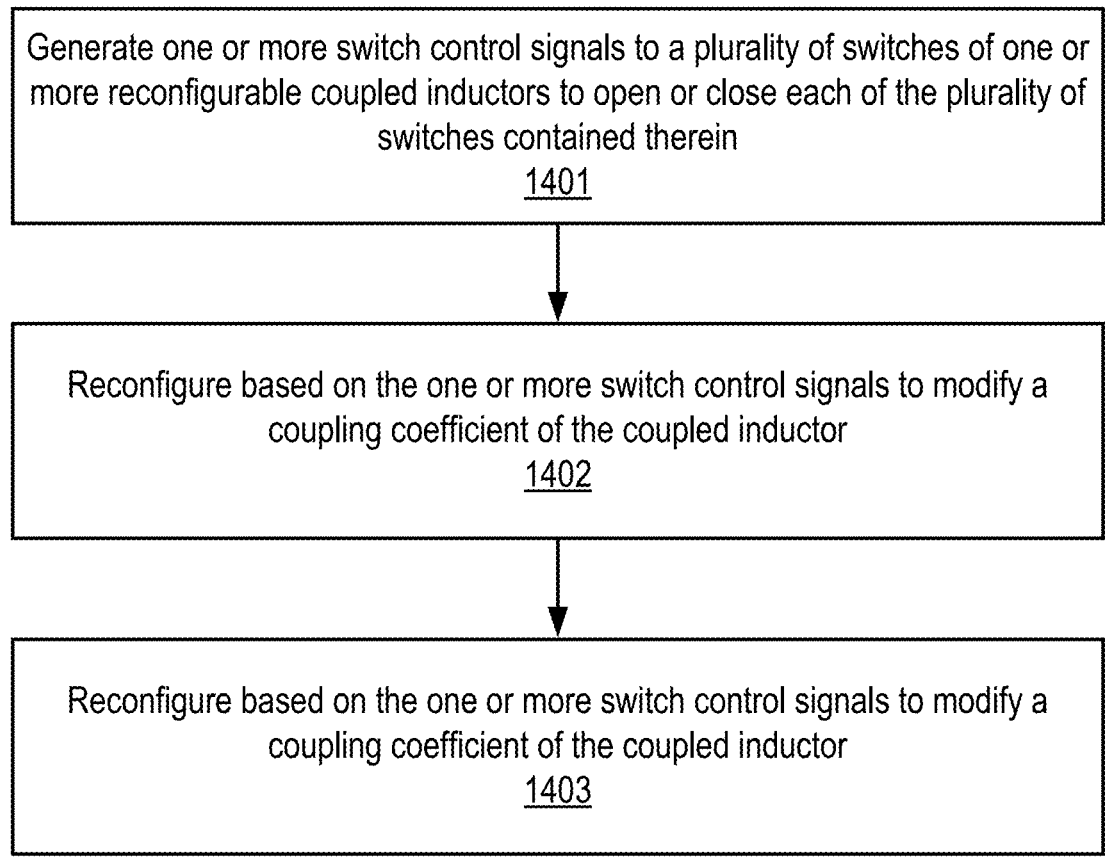
FIG. 14 is a flow diagram of one embodiment of a process for controlling a power delivery system.

FIG. 14 is a flow diagram of one embodiment of a process for controlling a power delivery system. The process is performed by processing logic that may comprise hardware (circuitry, dedicated logic, etc.), software (such as is run on a general purpose computer system or a dedicated machine), or a combination of both.

Referring to FIG. 14, the process begins by processing logic generating one or more switch control signals to a plurality of switches of one or more reconfigurable coupled inductors to open or close each of the plurality of switches contained therein (processing block 1401). In one embodiment, the switches set the coupling coefficient based on a number of switches that are closed or open. In one embodiment, the switches are coupled to a core material having metal rings located centrally within the coupled inductor, where the metal rings are controlled by the switches induce electric currents on the rings when one or more of the switches is closed.

In response to the signals, the reconfigurable coupled inductor is reconfigured based on the one or more switch control signals to modify a coupling coefficient of the coupled inductor (processing block 1402).

An Example of a System Containing a Power Delivery System

Figure 15:
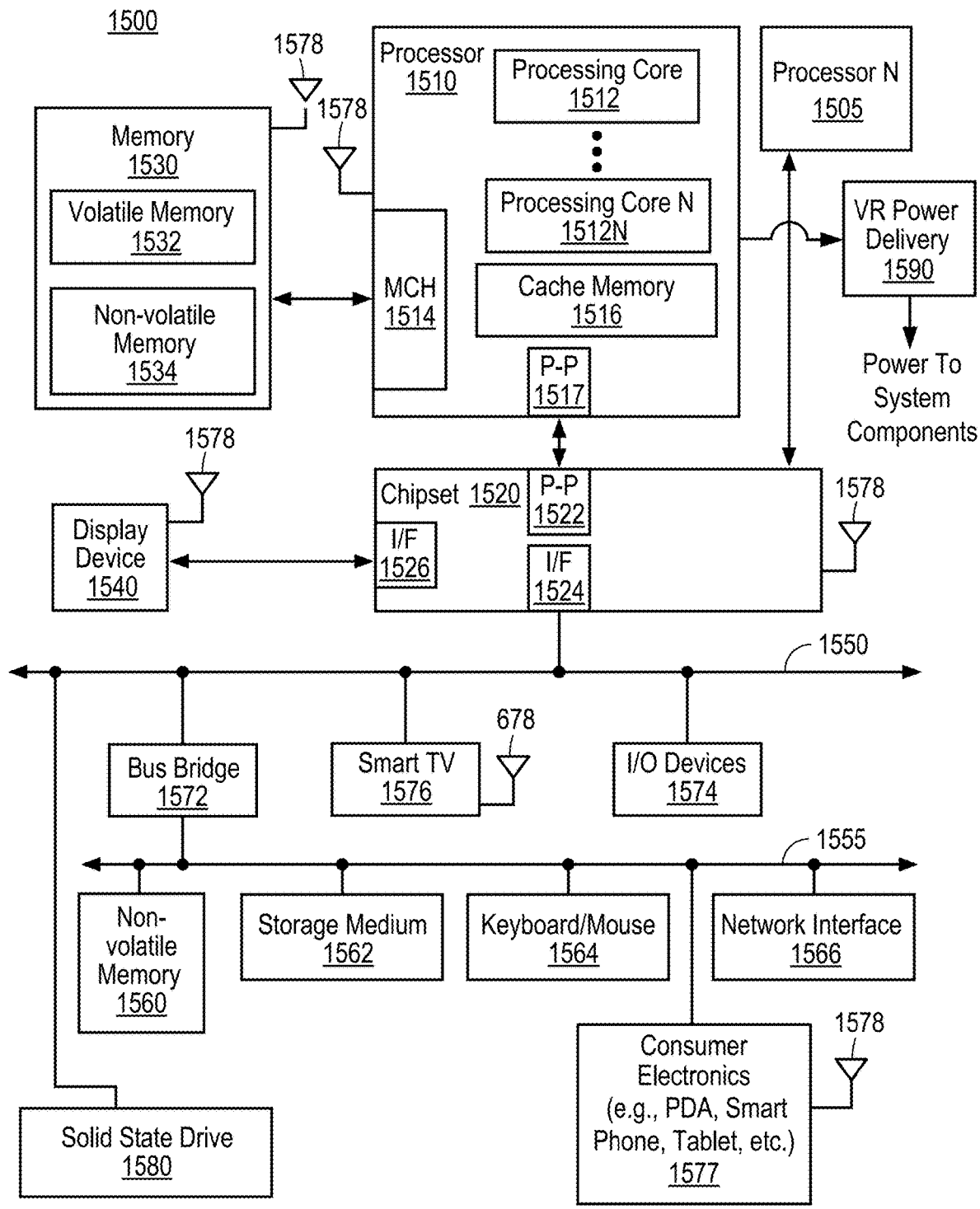
FIG. 15 is one embodiment of a system level diagram.

FIG. 15 is one embodiment of a system level diagram 1500 that may incorporate the techniques described above.

For example, the techniques described above may be incorporated into a processor in system 1500 or other part of system 1500.

Referring to FIG. 15, system 1500 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 1500 implements the methods disclosed herein and may be a system on a chip (SOC) system.

In one embodiment, processor 1510 has one or more processor cores 1512 to 1512N, where 1512N represents the Nth processor core inside the processor 1510 where N is a positive integer. In one embodiment, system 1500 includes multiple processors including processors 1510 and 1505, where processor 1505 has logic similar or identical to logic of processor 1510. In one embodiment, system 1500 includes multiple processors including processors 1510 and 1505 such that processor 1505 has logic that is completely independent from the logic of processor 1510. In such an embodiment, a multi-package system 1500 is a heterogeneous multi-package system because the processors 1505 and 1510 have different logic units. In one embodiment, processing core 1512 includes, but is not limited to, pre-fetch logic to fetch instructions, decode logic to decode the instructions, execution logic to execute instructions and the like. In one embodiment, processor 1510 has a cache memory 1516 to cache instructions and/or data of the system 1500. In another embodiment of the invention, cache memory 1516 includes level one, level two and level three, cache memory, or any other configuration of the cache memory within processor 1510.

In one embodiment, processor 1510 includes a memory control hub (MCH) 1514, which is operable to perform functions that enable processor 1510 to access and communicate with a memory 1530 that includes a volatile memory 1532 and/or a non-volatile memory 1534. In one embodiment, memory control hub (MCH) 1514 is positioned outside of processor 1510 as an independent integrated circuit.

In one embodiment, processor 1510 is operable to communicate with memory 1530 and a chipset 1520. In such an embodiment, SSD 1580 executes the computer-executable instructions when SSD 1580 is powered up.

In one embodiment, processor 1510 is also coupled to a wireless antenna 1578 to communicate with any device configured to transmit and/or receive wireless signals. In one embodiment, wireless antenna interface 1578 operates in accordance with, but is not limited to, the IEEE 802.11 standard and its related family, HomePlug AV (HPAV), Ultra-Wide Band (UWB), Bluetooth, WiMAX, or any form of wireless communication protocol.

In one embodiment, the volatile memory 1532 includes, but is not limited to, Synchronous Dynamic Random-Access Memory (SDRAM), Dynamic Random Access Memory (DRAM), RAMBUS Dynamic Random Access Memory (RDRAM), and/or any other type of random access memory device. Non-volatile memory 1534 includes, but is not limited to, flash memory (e.g., NAND, NOR), phase change memory (PCM), read-only memory (ROM), electrically erasable programmable read-only memory (EEPROM), or any other type of non-volatile memory device.

Memory 1530 stores information and instructions to be executed by processor 1510. In one embodiment, chipset 1520 connects with processor 1510 via Point-to-Point (PtP or P-P) interfaces 1517 and 1522. In one embodiment, chipset 1520 enables processor 1510 to connect to other modules in the system 1500. In one embodiment, interfaces 1517 and 1522 operate in accordance with a PtP communication protocol such as the Intel QuickPath Interconnect (QPI) or the like.

In one embodiment, chipset 1520 is operable to communicate with processor 1510, 1505, display device 1540, and other devices 1572, 1576, 1574, 1560, 1562, 1564, 1566, 1577, etc. In one embodiment, chipset 1520 is also coupled to a wireless antenna 1578 to communicate with any device configured to transmit and/or receive wireless signals.

In one embodiment, chipset 1520 connects to a display device 1540 via an interface 1526. In one embodiment, display device 1540 includes, but is not limited to, liquid crystal display (LCD), plasma, cathode ray tube (CRT) display, or any other form of visual display device. In addition, chipset 1520 connects to one or more buses 1550 and 1555 that interconnect various modules 1574, 1560, 1562, 1564, and 1566. In one embodiment, buses 1550 and 1555 may be interconnected together via a bus bridge 1572 if there is a mismatch in bus speed or communication protocol. In one embodiment, chipset 1520 couples with, but is not limited to, a non-volatile memory 1560, a mass storage device(s) 1562, a keyboard/mouse 1564, and a network interface 1566 via interface 1524, smart TV 1576, consumer electronics 1577, etc.

In one embodiment, mass storage device 1562 includes, but is not limited to, a solid state drive, a hard disk drive, a universal serial bus flash memory drive, or any other form of computer data storage medium. In one embodiment, network interface 1566 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

FIG. 15 also includes power delivery 1590 that provides power to components of system 1500. In one embodiment, power delivery 1590 is a VR-based power delivery system such as, for example, those shown in FIGS. 11-13, and includes one or more reconfigurable coupled inductors as described herein. In one embodiment, power delivery 1590 controls the one or more reconfigurable coupled inductors based on control signals from a processor in the system. In one embodiment, such control signals are sent on a SVID bus.

While the modules shown in FIG. 15 are depicted as separate blocks within the system 1500, the functions performed by some of these blocks may be integrated within a single semiconductor circuit or may be implemented using two or more separate integrated circuits.

In a first example embodiment, a reconfigurable coupled inductor comprises a plurality of metal rings and a plurality of switches coupled to the plurality of metal rings to control at least one inductor property based on a closed or open state of each of the plurality of switches.

In another example embodiment, the subject matter of the first example embodiment can optionally include that the plurality of metal rings and open or closed state of each of the plurality of switches controls a flux field of the inductor, which controls a coupling property of the inductor.

In another example embodiment, the subject matter of the first example embodiment can optionally include a core coupled to the plurality of rings and plurality of switches, the core having a core material with first and second windings coupled thereto, the core material including first and second outer legs around which the first and second windings, respectively, are wound, at least one inner core portion coupled to the first and second outer legs and having a third leg extending across the core material and located between the first and second outer legs, and where the plurality of switches are coupled to the at least one inner core to control an amount of coupling between the first and second outer legs with first and second windings thereon, respectively.

In another example embodiment, the subject matter of this example embodiment can optionally include that the at least one inner leg is part of an H-shaped inner core portion coupled to the first and second legs.

In another example embodiment, the subject matter of this example embodiment can optionally include that the plurality of switches control a coupling coefficient of the coupling based on switches in the plurality of switches being closed or open. In another example embodiment, the subject matter of this example embodiment can optionally include that the coupling coefficient is set based on a number of the plurality of switches that are closed or open.

In another example embodiment, the subject matter of this example embodiment can optionally include that the coupling is fully coupled when all switches of the plurality of switches are closed and decoupled when none of the plurality of switches are closed.

In another example embodiment, the subject matter of this example embodiment can optionally include that the coupling is fully coupled when all switches of the plurality of switches are open and decoupled when none of the plurality of switches are open.

In another example embodiment, the subject matter of the first example embodiment can optionally include that at least one of the plurality of switches comprise a transistor.

In another example embodiment, the subject matter of the first example embodiment can optionally include that at least one of the plurality of switches comprise a MEMS.

In another example embodiment, the subject matter of the first example embodiment can optionally include that at least one of the plurality of switches comprise an electric current switch operable to change state between a first resistivity state and a second resistivity state, the second resistivity state being lower than the first resistivity state.

In another example embodiment, the subject matter of the first example embodiment can optionally include that the core comprises a plurality of legs that include: at least two outer legs with windings; at least one inner leg with a winding thereon; and at least one leg extending across the core material and located between two legs having windings; and a plurality of switches coupled to the at least one leg to control coupling between the two legs.

In a second example embodiment, a power delivery apparatus comprises a power generator to generate power, a plurality of power stages coupled to receive power from the power generator, and a reconfigurable coupled inductor coupled to at least one power stage of the plurality of power gate stages.

In another example embodiment, the subject matter of the second example embodiment can optionally include that the reconfigurable coupled inductor comprises a plurality of metal rings and a plurality of switches coupled to the plurality of metal rings to control at least one inductor property based on a closed or open state of each of the plurality of switches.

In another example embodiment, the subject matter of the second example embodiment can optionally include that the plurality of metal rings and open or closed state of each of the plurality of switches controls a flux field of the inductor, which controls a coupling property of the inductor.

In another example embodiment, the subject matter of the second example embodiment can optionally include a core coupled to the plurality of rings and plurality of switches, the core having a core material with first and second windings coupled thereto, the core material including: first and second outer legs around which the first and second windings, respectively, are wound; at least one inner core portion coupled to the first and second outer legs and having a third leg extending across the core material and located between the first and second outer legs; and wherein the plurality of switches are coupled to the at least one inner core to control an amount of coupling between the first and second outer legs with first and second windings thereon, respectively. In another example embodiment, the subject matter of this example embodiment can optionally include that the at least one inner leg is part of an H-shaped inner core portion coupled to the first and second legs.

In another example embodiment, the subject matter of the second example embodiment can optionally include that the plurality of switches set a coupling coefficient of the coupling based on a number of switches in the plurality of switches being closed or open.

In another example embodiment, the subject matter of the second example embodiment can optionally include that the coupling is fully coupled when all switches of the plurality of switches are closed and decoupled when none of the plurality of switches are closed.

In another example embodiment, the subject matter of the second example embodiment can optionally include that the core comprise a plurality of legs that include: at least two outer legs with windings; at least one inner leg with a winding thereon; at least one leg extending across the core material and located between two legs having windings; and a plurality of switches coupled to the at least one leg to control coupling between the two legs.

In another example embodiment, the subject matter of the second example embodiment can optionally include one or more switch controller signals to control the reconfigurable coupled inductor.

In another example embodiment, the subject matter of the second example embodiment can optionally include that the reconfigurable coupled inductor is coupled to a pair of power stages that each provide one phase of power.

In another example embodiment, the subject matter of the second example embodiment can optionally include that the at least one power stage is part of a reconfigurable coupled inductor train coupled to the plurality of power stages.

In a third example embodiment, a system comprises a processor; a power delivery apparatus having a power generator to generate power, a plurality of power stages coupled to receive power from the power generator and coupled to the processor, and a reconfigurable coupled inductor coupled to at least one power stage of the plurality of power stages to provide power from the at least one power stage to the processor.

In another example embodiment, the subject matter of the third example embodiment can optionally include a core coupled to the plurality of rings and plurality of switches, the core having a core material with first and second windings coupled thereto, the core material including: first and second outer legs around which the first and second windings, respectively, are wound; at least one inner core portion coupled to the first and second outer legs and having a third leg extending across the core material and located between the first and second outer legs; a plurality of rings coupled to the at least one inner core portion; and a plurality of switches coupled to the plurality of rings and the at least one inner core to control an amount of coupling between the first and second outer legs with first and second windings thereon, respectively.

In another example embodiment, the subject matter of the third example embodiment can optionally include that the plurality of metal rings and the plurality of switches control a coupling coefficient of the coupling based on switches in the plurality of switches being closed or open.

In a fourth example embodiment, a method comprises generating one or more switch control signals to a plurality of switches of a reconfigurable coupled inductor to open or close each of the plurality of switches; and reconfiguring the coupled inductor based on the one or more switch control signals to modify a coupling coefficient of the coupled inductor.

In another example embodiment, the subject matter of the fourth example embodiment can optionally include that the plurality of switches set the coupling coefficient based on a number of switches in the plurality of switches being closed or open.

In another example embodiment, the subject matter of the fourth example embodiment can optionally include that the switches are coupled to metal rings located centrally within the coupled inductor to influence the flux field when one or more of the switches is closed.

Some portions of the detailed descriptions given above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A reconfigurable coupled inductor for use in a voltage regulator that has a switch controller, the inductor comprising:
at least two windings of the inductor; and
a plurality of metal rings and a plurality of switches coupled to the plurality of metal rings disposed between the at least two windings, wherein each of the metal rings of the plurality of metal rings is connected to each other forming a respective loop, wherein the metal rings of the plurality of metal rings and switches of the plurality of switches are configured to control, in response to one or more signals from the switch controller, at least one coupling property including a coupling coefficient between the at least two windings of the inductor based on a closed or open state of each of the plurality of switches, wherein a closed switch allows current to flow around a metal ring in a closed loop and an open switch prevents current to flow around a metal ring, and
wherein the plurality of metal rings and open or closed state of each of the plurality of switches controls a flux field of the inductor, which controls a coupling property of the inductor.

2. The reconfigurable coupled inductor defined in claim 1 further comprising a core coupled to the plurality of metal rings and the plurality of switches, the core having a core material with first and second windings coupled thereto, the core material including:
first and second outer legs around which the first and second windings, respectively, are wound;
at least one inner core portion coupled to the first and second outer legs and is located between the first and second outer legs; and
wherein the plurality of switches are coupled to the at least one inner core to control an amount of coupling between the first and second outer legs with the first and second windings thereon, respectively.

3. The reconfigurable coupled inductor defined in claim 2, wherein the at least one inner core portion is part of an H-shaped inner core portion coupled to the first and second outer legs.

4. The reconfigurable coupled inductor defined in claim 2, wherein the plurality of switches control a coupling coefficient of the coupling based on switches in the plurality of switches being closed or open.

5. The reconfigurable coupled inductor defined in claim 4, wherein the coupling coefficient is set based on a number of the plurality of switches that are closed or open.

6. The reconfigurable coupled inductor defined in claim 2, wherein the inductor is fully coupled when all switches of the plurality of switches are closed and decoupled when none of the plurality of switches are closed.

7. The reconfigurable coupled inductor defined in claim 2, wherein the coupling is fully coupled when all switches of the plurality of switches are open and decoupled when none of the plurality of switches are open.

8. The reconfigurable coupled inductor defined in claim 1, wherein at least one of the plurality of switches comprises a transistor.

9. The reconfigurable coupled inductor defined in claim 1, wherein at least one of the plurality of switches comprises a MEMS.

10. The reconfigurable coupled inductor defined in claim 1, wherein at least one of the plurality of switches comprises an electric current switch operable to change state between a first resistivity state and a second resistivity state, the second resistivity state being lower than the first resistivity state.

11. The reconfigurable coupled inductor defined in claim 1 further comprising a core coupled to the plurality of rings, wherein the core includes a core material, wherein the core comprises a plurality of legs that includes:
at least two outer legs with windings;
at least one inner leg with a winding thereon;
at least one leg extending across the core material and located between two legs having windings; and
a plurality of switches coupled to the at least one leg to control coupling between the two legs.

12. An apparatus comprising:
a switch controller for use in a voltage regulator;
a reconfigurable coupled inductor coupled to the switch controller, the inductor comprising:
at least two windings of the inductor; and
a plurality of metal rings and a plurality of switches coupled to the plurality of metal rings disposed between the at least two windings, wherein each of the metal rings of the plurality of metal rings is connected to each other forming a respective loop and the metal rings and switches are configured to control, in response to one or more signals from the switch controller, at least one coupling property including a coupling coefficient between the at least two windings of the inductor based on a closed or open state of each of the plurality of switches, wherein a closed switch allows current to flow around a metal ring in a closed loop and an open switch prevents current to flow around a metal ring, and
wherein the plurality of metal rings and open or closed state of each of the plurality of switches controls a flux field of the inductor, which controls a coupling property of the inductor.

13. The apparatus defined in claim 12 further comprising a core coupled to the plurality of rings and the plurality of switches, the core having a core material with first and second windings coupled thereto, the core material including:
first and second outer legs around which the first and second windings, respectively, are wound,
at least one inner core portion coupled to the first and second outer legs and located between the first and second outer legs, and
wherein the plurality of switches are coupled to the at least one inner core to control an amount of coupling between the first and second outer legs with the first and second windings thereon, respectively.

14. The apparatus defined in claim 13, wherein the at least one inner core portion is part of an H-shaped inner core portion coupled to the first and second outer legs.

15. The reconfigurable coupled inductor defined in claim 13, wherein the plurality of switches controls a coupling coefficient of the coupling based on switches in the plurality of switches being closed or open.

16. The reconfigurable coupled inductor defined in claim 15, wherein the coupling coefficient is set based on a number of the plurality of switches that are closed or open.

* * * * *